US005181064A

United States Patent [19]

Tagami et al.

[11] Patent Number: 5,181,064

[45] Date of Patent: Jan. 19, 1993

[54] CAMERA SHUTTER

[75] Inventors: Shigeru Tagami; Kazuo Akimoto; Katsuhiko Matsushita; Kanji Ito, all of Chiba, Japan

[73] Assignee: Seikosha Co., Ltd., Tokyo, Japan

[21] Appl. No.: 719,866

[22] Filed: Jun. 24, 1991

[30] Foreign Application Priority Data

Jun. 25, 1990 [JP] Japan .............................. 2-67123[U]

[51] Int. Cl.⁵ ......................... G03B 7/08; G03B 7/093

[52] U.S. Cl. ..................................... 354/437; 354/458

[58] Field of Search ............... 354/435, 437, 439, 458, 354/444

[56] References Cited

U.S. PATENT DOCUMENTS 3,950,765 4/1976 Nanba et al. ........................ 354/444
4,229,088 10/1980 Yuasa et al. ......................... 354/458
4,325,614 4/1982 Grimes ................................ 354/437
4,354,748 10/1982 Grimes et al. .................. 354/437 X
4,751,543 6/1988 Kodaira et al. ..................... 354/435
4,907,027 3/1990 Kobe et al. .......................... 354/435
4,989,030 1/1991 Naka et al. .......................... 354/435

*Primary Examiner*—Richard A. Wintercorn
*Assistant Examiner*—Jae N. Noh
*Attorney, Agent, or Firm*—Jordan and Hamburg

[57] ABSTRACT

A camera shutter system has a motor driven sector for opening and closing a shutter opening. A photo-interruptor is positioned to intercept a light beam, to effect the sequential generation of first and second photo-interruptor signal pulses, the first pulse having a width that is a function of the speed of the sector. A timer has a counter that is set to a first count corresponding to an exposure value that is a function of the brightness of an object to be photographed and the width of the first photo-interruptor signal. The timer is controlled to count down in response to the second photo-interruptor signal, and the sector driving motor is energized during the count down of the timer.

6 Claims, 4 Drawing Sheets

FIG. 1

CAMERA SHUTTER

FIELD OF THE INVENTION

This invention relates to a camera shutter especially adapted to compensate, in a feedforward control manner, with disturbances such as decreasing of battery power, fluctuation of a discharging peak due to a conflict between the load of a motor for driving the camera shutter and other loads, and changing of the conditions of use of a camera, such as the sighting posture, temperature and humidity.

This invention is related to co-pending U.S. Ser. No. 07/717,444, filed Jun. 19, 1991, and to U.S. Ser. No. 07/719,880, U.S. Ser. No. 07/719,875, both filed concurrently herewith. The contents of these three applications are incorporated herein by reference.

BACKGROUND OF THE INVENTION

A sector forming a part of a camera shutter is generally a mechanical element which is actuated by rotating a motor to define an exposure quantity and an aperture diameter. As a consequence, if the rotation of the motor fluctuates due to a change in battery power, the exposure quantity and aperture diameter cannot be defined properly, and synchronized operation of a strobe light cannot be attained, thereby resulting in inferior photography.

According to Japanese Laid-Open Patent Document No. 61-163027 "Speed Control Device of Camera Shutter Driving Motor", the shutter closing time relating to an exposure quantity $E_V$ is stored in a memory circuit in the form of data for the control of motor speed or data for the control of the width of driving pulses to be sent to a motor. As soon as the operating speed of a sector is detected, the width of the driving pulses is determined as a function of the data stored in the memory circuit, so that proper exposure is attained by controlling the rotational speed of the motor.

According to Japanese Laid-Open Patent Document No. 62-194239 "Camera Shutter Control Device", the time from the starting of rotation of a shutter driving motor to the time that a sector begins to open is detected, and in response to the time thus detected, the closing time of a shutter opening is set, so that a proper exposure is attained irrespective of battery voltage.

According to Japanese Laid-Open Patent Document No. 16-163027 and Japanese Laid-Open Patent Document No. 62-194239 as described above, in order to prevent the motor from operating improperly due to fluctuation in battery voltage, the rotational speed of the motor is controlled, or one data element from an exposure control data table is selected corresponding to brightness, as a function of the motor speed.

When the shutter sector is actuated by a motor whose rotor comprises a permanent magnet, however, the relationship between the opening diameter and the elapsed time changes due to several parameters, one of which is the speed of the sector.

Therefore, if the sector speed and the brightness are subjected to calculation and the calculation result is used to access the data, accurate control cannot be attained.

Further, if accurate calculation is desired, an arithmetic circuit for making the calculation must be complicated, and the volume of required data increases. It is therefore hard to control the actuation of the sector in a short time.

SUMMARY OF THE INVENTION

It is an object of the present invention to provide a camera shutter that overcomes the above disadvantages, and that employs a simple circuit configuration for compensating, in a feedforward control manner, with disturbances resulting from, for example, decreasing battery power, fluctuation of a discharging peak, and changing of the conditions of use of a camera, such as the sighting posture, temperature and humidity. In accordance with the invention, a photo-interruptor means is provided for outputting first and second photo-interruptor signals in response to the passage of a light beam and the interception thereof by a sector having a plurality of signal edges. A timer, using a count corresponding to an exposure quantity predicted in response to the first photo-interruptor signal, defining a starting speed coefficient, begins its counting operation in response to the second photo-interruptor signal.

In order to achieve the foregoing object, a camera shutter according to the present invention comprises a motor, a sector having a plurality of signal edges formed in a peripheral portion thereof, the sector being arranged to open and close a shutter opening in response to the rotation of the motor. A photo-interruptor means includes light emitting and light receiving elements for delivering first and second photo-interruptor signals in response to the passage of first, second and third signal edges of the sector. A timer is set to a count value corresponding to an exposure quantity that is a function of the brightness information of an object to be photographed and the first photo-interruptor signal. The timer is controlled to begin its counting operation in response to the second photo-interruptor signal. Motor driving means are provided for driving the motor in response to the operation of the timer.

BRIEF DESCRIPTION OF THE DRAWINGS

An embodiment of a camera shutter according to the present invention will now be described in greater detail with reference to the accompanying drawings.

FIG. 1 is a block diagram of a camera shutter according to the present invention;

DESCRIPTION OF THE PREFERRED EMBODIMENTS

Figure 1:
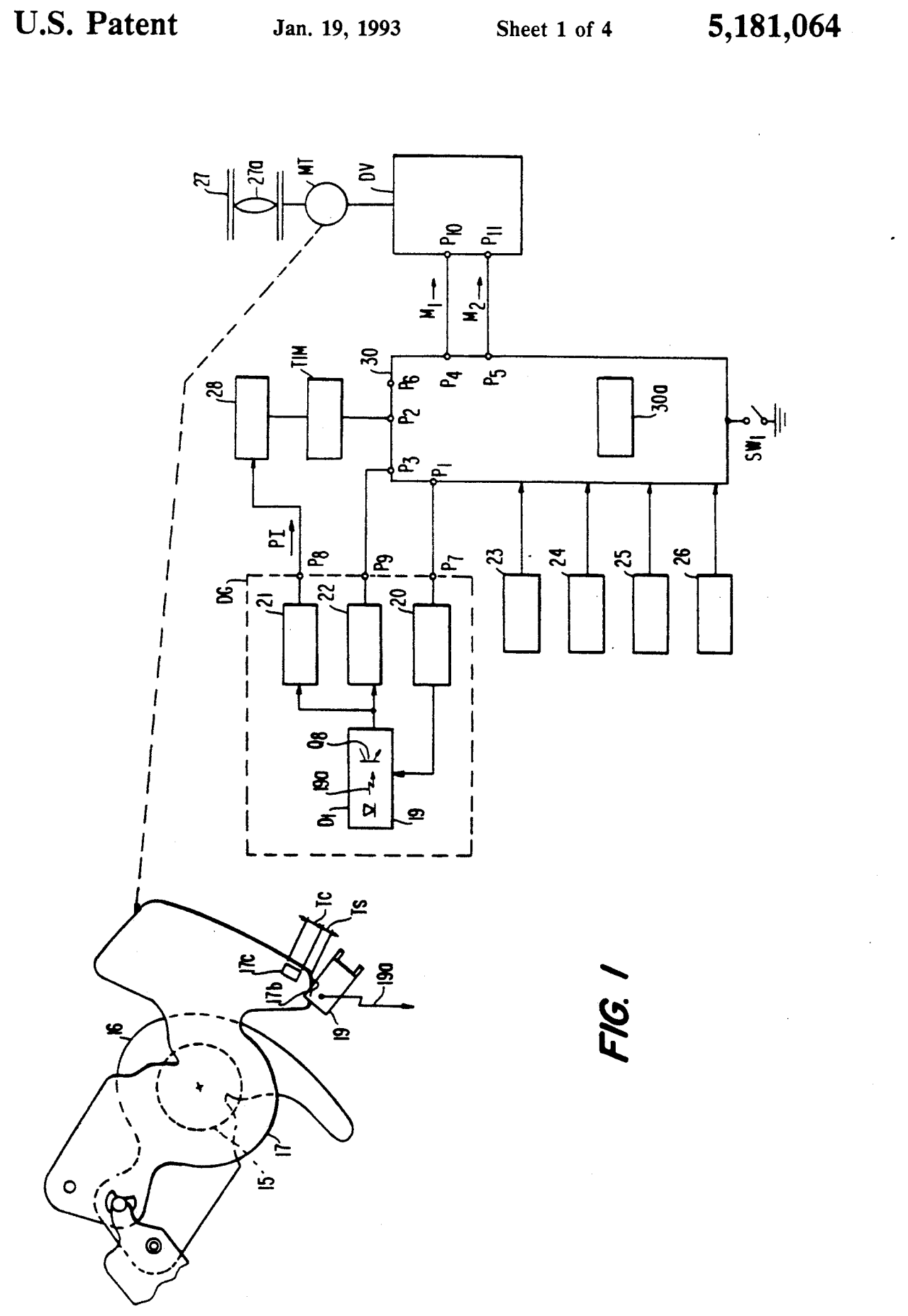
Figure 2:
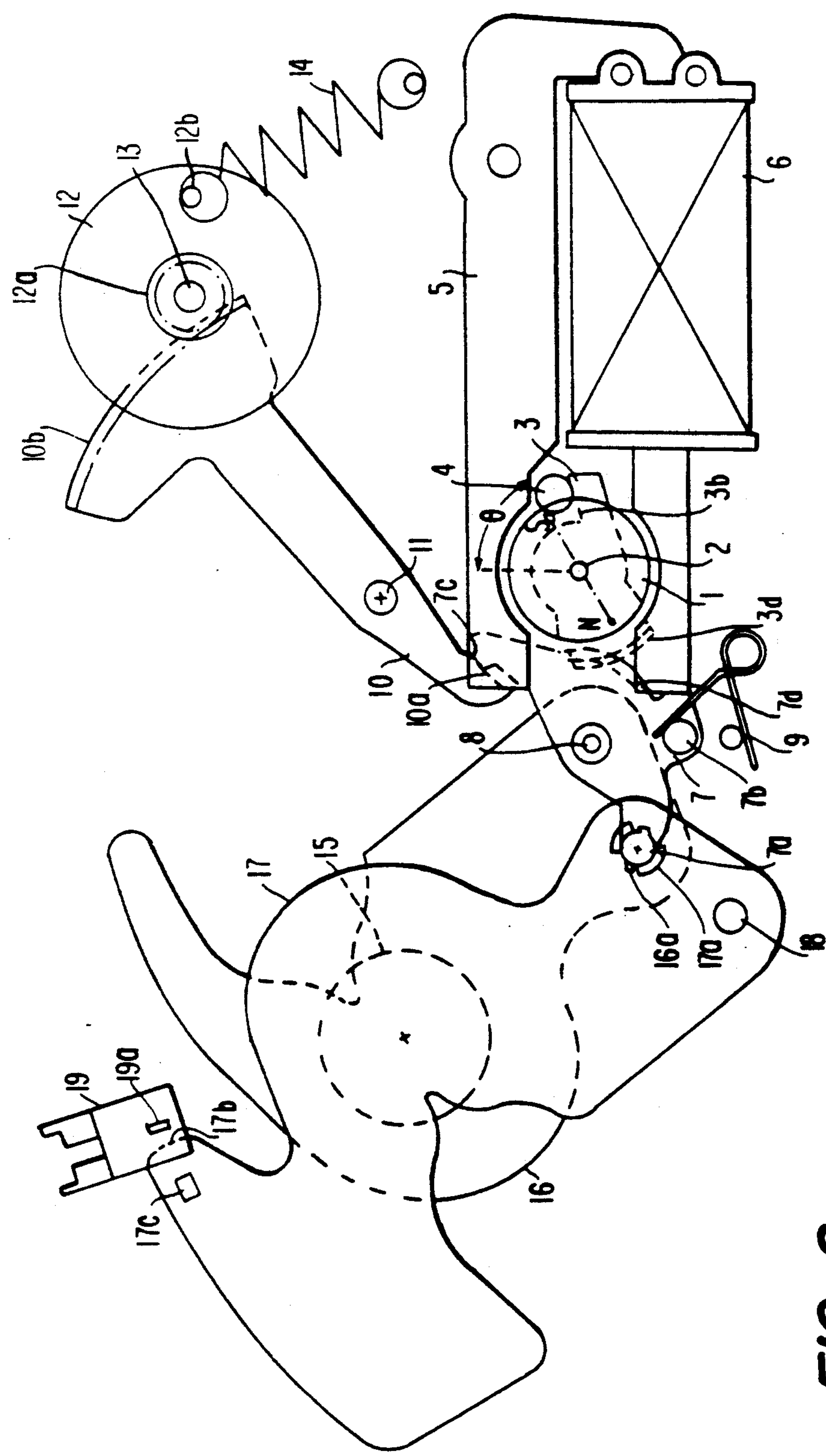
FIG. 2 is an enlarged structural diagram showing sectors and a rotor of the shutter of FIG. i.

As shown in FIG. 1, a camera shutter comprises a motor MT for moving sectors 16 and 17; a PI signal generating circuit DG including a photo coupler 19 comprised of a light emitting diode $D_1$ and a light receiving transistor $Q_8$, a starter circuit 20, a PI signal sending circuit 21, and a data access circuit 22. The shutter further includes a timer count calculating circuit 28; a timer TIM; a motor driving circuit DV including transistors $Q_1$ through $Q_6$ for driving a motor coil 6; and a CPU 30 including a ROM 30*a*. The CPU 30 stores a motor control program and a timer program.

As shown in FIG. 2, the rotor 1 of a motor MT is comprised of a permanent magnet radially magnetized to exhibit two poles. A rotor shaft 2 is press-fit to the motor at the center of the magnet. A rotor pinion 3 has a gear portion *3a* in engagement with a gear portion *7d* of an open/close lever 7, and an arm portion *3b* acting as stopper This arm portion *3b* is designed so that when the motor coil 6 on a stator 5 is not energized, the rotor 1 stops at an angular displacement 0 of about 58 degrees with respect to a stationary position. This angle is determined by the press-fit angle of the arm portion *3b* of the rotor pinion 3 with respect to the magnetization angle of the rotor 1.

The stator 5 and the motor coil 6 are positioned outside the rotor 1. The motor coil 6 can be energized in both, forward and backward directions, that is, the sectors 16 and 17 open in response to forward energization of the coil and close in response to backward energization of the coil. Specifically, when the motor coil 6 is forwardly energized at one electric polarity, the magnetic pole of the stator 5 and the opposing magnetic pole of the rotor 1 assume the same magnetic polarity, so that the rotor 1 is repulsed and rotated. Backward energization of the coil produces the opposite result.

The open/close lever 7 has a pin *7a* for driving the sectors 16 and 17. A protrusion *7b* of the lever 7 serves as the point of action of a spring 9. A projection portion *7c* is provided for pushing an intermediate lever 10. The gear portion *7d* of the lever 7 engages the rotor pinion 3.

The spring 9 urges the open/close lever 7 in the shutter closing direction, so that even when the motor coil 6 is not energized, the sectors 16 and 17 are urged by the spring 9 from the open position toward the closed position.

The intermediate lever 10 has an arm portion 10*a* acting on the open/close lever 7 and a gear portion 10*b* engaging a gear portion 12*a* of a flywheel 12. This flywheel 12 has a gear portion 12*a* and a protrusion 12*b* on which a flywheel spring 14 acts. The flywheel spring 14 urges the flywheel 12 and the intermediate level 10 in the shutter closing direction. In the initial state of the shutter, the intermediate lever 10 abuts the projection portion *7c* of the open/close lever 7.

The sector 16 is pivoted at the rotational center 8 of the open/close lever 7, and the pin *7a* is rotatably fitted in a slot 16*a*.

The sector 17 is pivoted to a front casing 18, and the pin *7a* fitted in the sector 16 is rotatably fitted in a slot 17*a* in the same manner as the sector 16.

The sector 17 has an edge 17*b*, referred to herein as a first edge, and a rectangular hole 17*c* having a leading margin referred to herein as a second edge and a trailing margin referred to herein as a third edge. These edges serve as a detecting section and function to selectively intercept and pass a light beam 19*a* of the photo coupler 19, to cause the generation of first and second photo-interruptor signals. The first photo-interruptor signal defines a starting speed coefficient TS.

The photo coupler 19 is designed so that a peripheral portion of the sector 7 is inserted between its light emitting and light receiving sections at determined displacements of the sector. The photo-interruptor signal output from the photo coupler 19 assumes an L level in the initial state when the beam is not intercepted by the sector 7 and an H level when the sector 17 is driven to intercept the beam 19*a* at the sector edge 17*b*. The signal again assumes an L level when the beam passes through the rectangular hole 17*c* and an H level when the edge of the rectangular hole 17*c* intercepts the beam. The photo-interruptor signal is applied via the sending circuit 21 to the CPU 30, where the signal is referred to as a PI signal.

Figure 3:
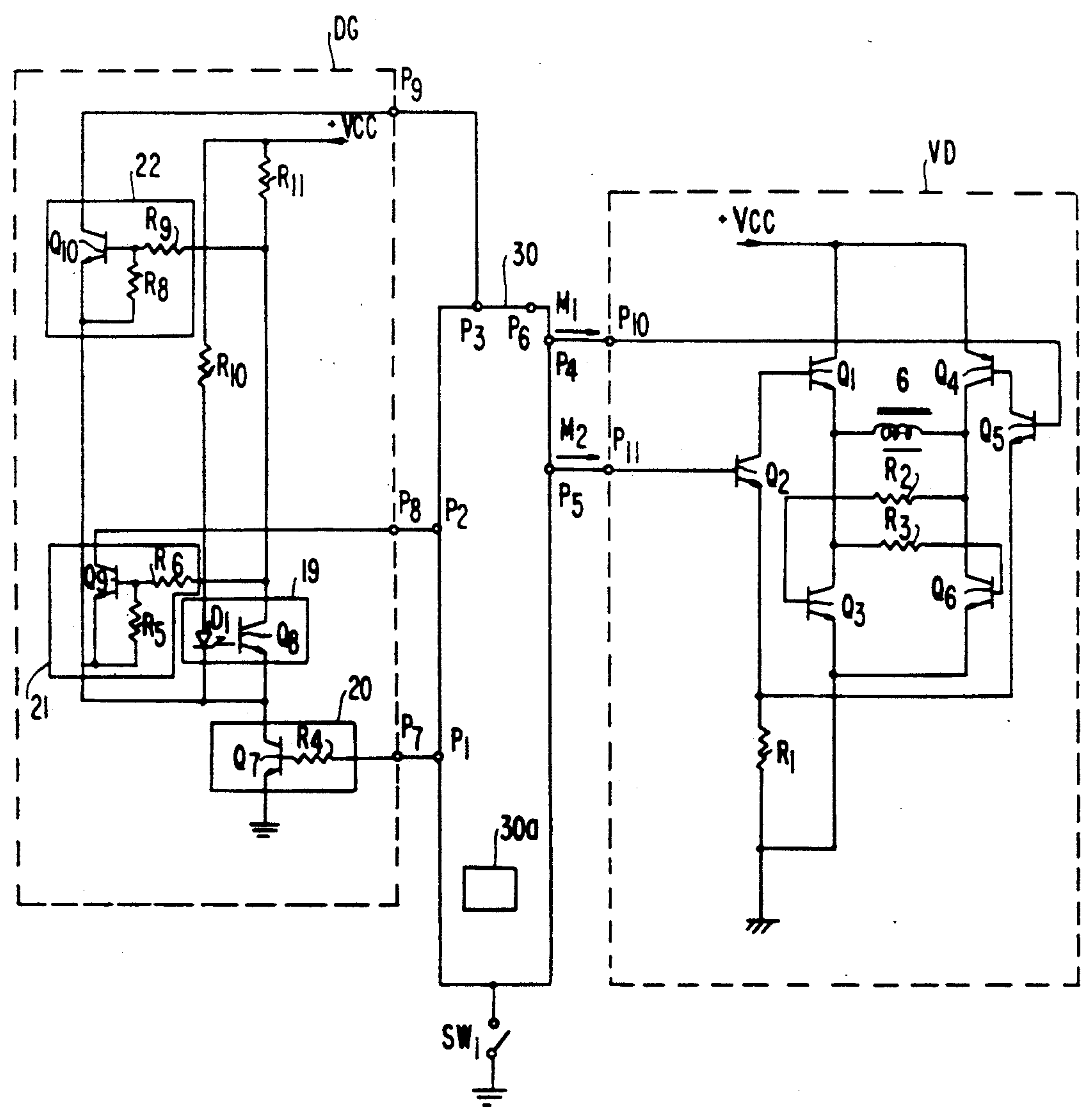
FIG. 3 is a circuit diagram showing a portion of FIG. 1, with the timer and calculator being within the CPU.

As shown in FIG. 3, the PI signal generating circuit DG and the motor driving circuit DV of FIG. 1 are designed so that the pins $P_1$, $P_2$, $P_3$ and $P_4$, $P_5$ of the CPU 30 are connected to the pins $P_7$, $P_8$, $P_9$ of the PI signal generating circuit DG and the pins $P_{10}$, $P_{11}$ of the motor driving circuit DV, respectively. Pin $P_8$ is connected to pin $P_2$ via a timer TIM and timer count calculating circuit 28 (See FIG. 1).

The starter circuit 20 of the PI signal generating circuit DG is comprised of a transistor $Q_7$ and a resistor $R_4$. The base of the transistor $Q_7$ is connected via the resistor $R_4$ to the pin $P_7$ and its emitter is connected to a reference potential point. When driven by the CPU 30, the transistor $Q_7$ turns on to couple the reference potential point to the photo coupler 19, PI signal sending circuit 21, and data access circuit 22 via the collector of transistor $Q_7$.

The cathode of the light emitting diode $D_1$ and the emitter of the light receiving transistor $Q_8$ in the photo coupler 19 are connected to the collector of the transistor Q7, and the anode of the light emitting diode $D_1$ and the collector of the light receiving transistor $Q_8$ are connected to a power source $+V_{cc}$ via resistors $R_{10}$ and $R_{11}$, respectively.

The base of a transistor $Q_9$ of the PI signal sending circuit 21 is connected via a resistor $R_6$ to the collector of the light receiving transistor $Q_6$. Its emitter is connected to the collector of the transistor $Q_7$, and its collector is connected to the pin $P_8$, so that the PI signal is applied from the collector to the pin $P_8$. The initial PI signal that is output is called a first photo-interruptor signal, and the PI signal subsequently sent out is called a second photo-interruptor signal. In the following description, the first photo-interruptor signal defines a starting speed coefficient TS (or pulse TS), and the second photo-interruptor signal defines a shutter starting pulse TC.

The base of a transistor $Q_{10}$ of the data access circuit 22 is connected via a resistor $R_9$ to the collector of the light receiving transistor $Q_8$, and its collector is connected to the pin $P_9$.

The timer count calculating circuit 28 receives the PI signal from the pin $P_8$ of the PI signal generating circuit DG, and when the PI signal is defining the starting speed pulse TS, the circuit 28 calculates an exposure quantity $E_V$ as a function of the starting speed pulse TS and sets the thus obtained value in the timer TIM. When the PI signal from the pin $P_8$ is defining the shutter starting pulse TC, the timer TIM is clocked to decrease the thus set value one by one, and when the count of the timer TIM becomes zero, the pin $P_2$ of the CPU 30 is notified that the shutter open time has been terminated.

The respective base of the transistors $Q_2$ and $Q_5$ of the motor driving circuit DV are connected to the pins $P_{11}$ and $P_{10}$, respectively, and the $M_1$ and $M_2$ signals are normally at the L level. When the $M_1$ signal assumes an H level with the $M_2$ signal at the L level, the transistors $Q_5$, $Q_3$ and $Q_4$ turn on to energize the motor coil 6 in the direction of the solid-line arrow, so that the sectors 16 and 17 are opened. On the other hand, when the $M_2$ signal assumes an H level, the transistors $Q_2$, $Q_1$ and $Q_6$ turn on, so that the sectors 16 and 17 are closed.

In FIG. 1, block 23 is a film-sensitivity detecting section, block 24 is a photometer section, block 25 is a distance measuring section, block 26 is a mode selecting section, block 27 is a lens-barrel, block 27*a* is a lens, and $SW_1$ is a release button.

OPERATION OF THE INVENTION

In the above described camera shutter, when the release button $SW_1$ is depressed, rotation of the motor causes the edge 17*b* of the sector 17 to be inserted between the light emitting diode $D_1$ and light receiving transistor $Q_8$ of the photo coupler 19, to intercept the light beam 19*a*. As a result, the PI signal is output from the PI signal sending circuit 21 to the pin $P_8$. The PI signal corresponds to the distance TS between the edge 17*b* and the leading edge of the hole 17*c* of the sector 17, the sector moving relative to the optical axis of the photo coupler 19. The elapsed time defines the starting speed coefficient TS and allows a prediction of the speed of the sector 17. When the speed of the sector 17 is relatively fast, under the influence of voltage, temperature, etc., the time becomes relatively short, whereas when the speed is relatively slow, the time becomes relatively long.

Figure 4:
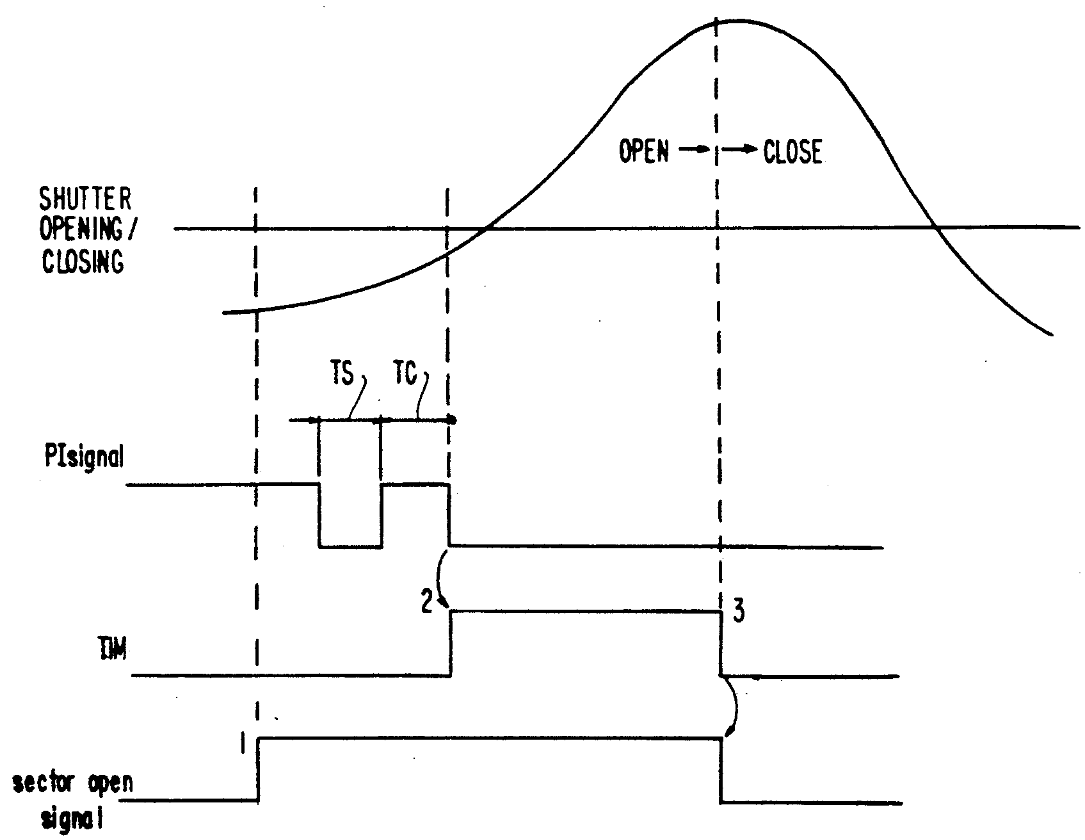
FIG. 4 is a timing diagram showing the operation of the shutter.

When the release button $SW_1$ is depressed, the shutter opening operation begins at point (1) in FIG. 4, and the timer count calculating circuit 28 predicts points (2) and (3) of the timer TIM as a function of the starting speed coefficient TS, and sets a count corresponding to the exposure quantity $e_V$ in the timer TIM. Then, when the shutter starting pulse TC is output from the pin $P_8$ of the PI signal generating circuit PI, the shutter opening operation begins at point (2) and the timer TIM is clocked to decrease the thus set value one by one. When the value of the timer TIM reaches zero, the shutter is closed.

In the foregoing embodiment, the data processing operation between the CPU 30 and the PI signal generating circuit DG inclusive of the starter circuit 20, PI signal sending circuit 21, and data access circuit 22 may be changed to a serial mode of operation so that the pins $P_1$, $P_2$, $P_3$, $P_7$, $P_9$ and $P_8$ can be combined.

The edge 17*b* and rectangular hole 17*c* provided to function as the detecting section may be formed such that the relationship between beam interception and beam passing is opposite to the embodiment described above.

Further, instead of selectively intercepting and passing the light beam 19*a*, the detecting section may be modified as to utilize a reflection pattern formed on the sector surface which selectively causes reflection and non-reflection or transmission of the beam.

The camera shutter according to the present invention comprises a motor, and a sector having a plurality of signal edges formed in a peripheral portion thereof for opening and closing a shutter opening in response to the rotation of the motor. A photo-interruptor means includes light emitting and light receiving elements for outputting first and second photo-interruptor signals in conjunction with the passage thereby of first, second and third edges of the sector. A timer is set to a count value corresponding to an exposure quantity set that is a function of brightness information of an object to be photographed and the first photo-interruptor signal. The timer begins its counting operation in response to the second photo-interruptor signal.

Motor driving means drives the motor in response to the count down of the timer. Therefore, using a simplified circuit and open-loop feedforward control, it is possible to compensate for disturbances caused by changing of the conditions of use of the camera, such as the sighting posture, temperature and humidity.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. A camera shutter comprising a motor, a section having a plurality of signal edges formed in a peripheral portion thereof, said sector comprising means for opening and closing a shutter opening in response to the rotation of the motor, photo-interrupter means including light emitting and light receiving elements for delivering first and second photo-interrupter signals in response to the passage thereby of first and second, and third edges, respectively, of said plurality of signal edges of the sector, a timer, means for determining brightness of an object to be photographed, means for setting said timer to a count value corresponding to said exposure quantity and the first photo-interruptor signal, and means for controlling said timer to begin its counting operation in response to the second photo-interruptor signal, and motor driving means for driving the motor in response to the operation of the timer.

2. A camera shutter system comprising a motor, a sector responsive to rotation of said motor for opening and closing a shutter opening, a photo-interruptor including a source of a light beam and a receiver positioned to receive said light beam, said sector having first, second and third intercepting portions for sequentially intercepting said beam upon rotation of said sector to control said photo-interruptor to output sequential first and second photo-interruptor signals corresponding to said first and second, and said third intercepting portions, respectively, a timer including a counter, means providing an exposure quantity corresponding to the brightness of an image to be photographed, means for setting said counter to a first count corresponding to said exposure quantity and said first interruptor signal, means responsive to said second interruptor signal for controlling said timer to count from said first count to a second predetermined count, and means responsive to the counting of said timer for energizing said motor to rotate.

3. A camera shutter system according to claim 2, wherein said first intercepting portion is a leading edge of said sector, and said second and third intercepting portions are leading and trailing edges of an aperture in said sector.

4. A camera shutter system according to claim 2, wherein said second count is zero, and said means for controlling said timer comprises means for controlling said timer to count downward.

5. A camera shutter system according to claim 2, wherein said sector is positioned between said means for emitting a light beam and said means for receiving a light beam.

6. A camera shutter system according to claim 2, wherein said first and second photo-interruptor signals are pulses, whereby said first photo-interruptor signal has a width that is a function of the speed of movement of said sector.

* * * * *